US010742420B1

(12) United States Patent
Griffin

(10) Patent No.: US 10,742,420 B1
(45) Date of Patent: Aug. 11, 2020

(54) QUANTUM-RESISTANT DOUBLE SIGNATURE SYSTEM

(71) Applicant: Wells Fargo Bank, N.A., San Francisco, CA (US)

(72) Inventor: Phillip H. Griffin, Raleigh, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 333 days.

(21) Appl. No.: 15/917,251

(22) Filed: Mar. 9, 2018

(51) Int. Cl.
*H04L 9/08* (2006.01)
*H04L 9/32* (2006.01)
*H04L 29/06* (2006.01)

(52) U.S. Cl.
CPC .......... *H04L 9/3247* (2013.01); *H04L 9/0825* (2013.01); *H04L 9/0861* (2013.01); *H04L 9/3236* (2013.01); *H04L 63/123* (2013.01); *H04L 63/126* (2013.01)

(58) Field of Classification Search
CPC .... H04L 9/3247; H04L 9/0825; H04L 9/0861
USPC ........................................................ 713/176
See application file for complete search history.

(56) References Cited

U.S. PATENT DOCUMENTS

| | | | |
|---|---|---|---|
| 7,246,240 B2 | 7/2007 | Chuang et al. | |
| 9,118,464 B2* | 8/2015 | Nix | G06F 21/35 |
| 9,503,257 B2 | 11/2016 | Tanizawa | |
| 9,660,978 B1* | 5/2017 | Truskovsky | H04L 9/006 |
| 10,230,525 B2* | 3/2019 | Campagna | H04L 9/0836 |
| 10,452,401 B2* | 10/2019 | Kenney | G06F 9/3867 |
| 2009/0003591 A1 | 1/2009 | Murakami et al. | |
| 2016/0080156 A1* | 3/2016 | Kaliski, Jr. | H04L 9/3247 713/176 |
| 2017/0272250 A1* | 9/2017 | Kaliski, Jr. | H04L 61/1511 |
| 2018/0262339 A1* | 9/2018 | Kazin | H04L 9/3265 |
| 2018/0262504 A1* | 9/2018 | Frederick | H04L 63/0435 |

* cited by examiner

*Primary Examiner* — Shin-Hon (Eric) Chen
*Assistant Examiner* — Dereena T Cattungal
(74) *Attorney, Agent, or Firm* — Foley & Lardner LLP

(57) ABSTRACT

An example method includes receiving a messageDigest attribute value comprising a hash of content. The messageDigest attribute value is digitally signed with a first private key associated with the message computing system using a quantum-resistant signature algorithm to generate a quantum-resistant digital signature value. A QSignerinfo type is generated that includes at least one of a public key identifier of the public key and the quantum-resistant digital signature value. A QSignerinfo attribute is generated that identifies the QSignerinfo type. The QSignerinfo attribute is transmitted to a recipient. the recipient digitally signs the QSignerinfo attribute with a second private key associated with the recipient using a quantum-vulnerable signature algorithm to generate a double signature value. Origin authenticity of the double signature value can be determined by using a second public key of the recipient, the second public key of a second public/private key pair including the second private key.

20 Claims, 5 Drawing Sheets

QUANTUM-RESISTANT DOUBLE SIGNATURE SYSTEM

BACKGROUND

As computer-based technologies have evolved, conventional in-person and paper-based transactions and communications are increasingly performed electronically over networks (e.g., the internet). Although electronic communications have significantly reduced costs and improved efficiencies, they pose significant risks regarding identification and authentication of signing parties, integrity of data, and confidentiality.

Digital signatures are mathematical schemes for demonstrating the data integrity and origin authenticity of digital messages or electronic documents. A variety of cryptographic techniques are used to encrypt data and to create digital signatures. With symmetric key cryptographic systems, a pair of users who desire to exchange data securely use a shared "symmetric" key. With this type of approach, a sender of a message uses the same key to encrypt the message that a recipient of the message uses to decrypt the message. Symmetric key systems require that each sender and recipient establish the shared key in a secure manner. Public key systems (e.g., asymmetric key cryptography) may also be used to exchange messages securely. With public-key cryptographic systems, two types of keys are used—public keys and private keys. A sender of a message may encrypt the message using the public key of a recipient. The recipient may use a corresponding private key to decrypt the message.

Additionally, public key cryptographic systems (e.g., asymmetric key cryptographic systems) may be used to produce digital signatures. A recipient of a message that has been digitally signed can use the digital signature to verify the identity of the message sender and to confirm that the message has not been altered during transit. In a typical digital signature arrangement, a sender uses a cryptographic hash function to produce a hash (e.g., message digest). The hash is much smaller than the original message and is relatively unique to the message. The sender then uses its private key to generate the digital signature using the hash. The process of signing the message uses a mathematical operation that can only be performed by the sender who possesses the private key. The message and the digital signature can then be sent to a recipient. As will be appreciated, the recipient (e.g., the relying party) is an entity that can use the digital signature and the message sender's public key (e.g., encapsulated in a certificate) to determine that the sender is the message signer and that the integrity and origin authenticity of the message has not been compromised.

As transactions, interactions, and communications occur over various internet-centric services, the protection of sensitive information needs to be efficient and effective, providing assurance of the identity of the party while not compromising any sensitive information or slowing down information exchange processes with heavy (e.g., processor-intensive) protection mechanisms and to be resistant to compromise from more efficient and effective computing systems. This is especially true with the development of quantum computing. Quantum computing is the utilization of quantum mechanics (e.g., the universe's behavior at the microscopic level) to develop exponentially faster methods of performing certain practical calculations. Generally, in quantum computing or in a quantum computer, one stores quantum information in qubits; qubits perform a role akin to the role of memory in a standard computer. The quantum computer then performs manipulations on the qubits by a sequence of logical quantum gates. Quantum computers are not the only technology where such quantum memories are required. As will be appreciated, cryptographic systems that may be resistant to brute force or compromise by traditional computing system may be susceptible to brute force and compromise by quantum computing systems due to the exponentially faster methods of performing certain practical calculations. Thus, the protection of sensitive information needs to be able to withstand unauthorized users that make use of quantum computing systems to impersonate and gain access to cryptographic keys.

SUMMARY

Various embodiments relate to a method performed by a processor of a message computing system. An example method includes receiving a messageDigest attribute value comprising a hash of content. The messageDigest attribute value is digitally signed with a first private key associated with the message computing system using a quantum-resistant signature algorithm to generate a quantum-resistant digital signature value. A QSignerinfo type is generated that includes at least one of a public key identifier of the public key and the quantum-resistant digital signature value. A QSignerinfo attribute is generated that identifies the QSignerinfo type. The QSignerinfo attribute is transmitted to a recipient. The recipient digitally signs the QSignerinfo attribute with a second private key associated with the recipient using a quantum-vulnerable signature algorithm to generate a double signature value. Origin authenticity of the double signature value can be determined by using a second public key of the recipient, the second public key of a second public/private key pair including the second private key. Data integrity of the content associated with the double signature can be verified via the hash of the content.

Various embodiments relate to a method performed by a processor of a messaging computing system. An example method includes receiving a doubleSignerinfo attribute. The doubleSignerinfo attribute includes a messageDigest attribute value associated with a digitally signed QSDS message. The QSDS message is generated by digitally signing a value of SignedAttributes comprising the messageDigest attribute value with a first private key associated with a signing party using a quantum-vulnerable signature algorithm. The messageDigest attribute value includes a hash of content. A quantum identifier signaling that the QSDS message is associated with a Signerinfo attribute of the message computing system is included in the doubleSignerinfo attribute. The doubleSignerinfo attribute is digitally signed with a private key associated with the message computing system using a quantum-resistant signature algorithm to generate a quantum-resistant digital signature value. Origin authenticity of the quantum-resistant digital signature value can be determined by using a second public key of the recipient, the second public key of a second public/private key pair including the second private key. Data integrity of the content associated with the quantum-resistant digital signature value can be verified using the hash of the content and the QSDS message.

Various other embodiments relate to a messaging computing system. The messaging computing system includes a storage location comprising a plurality of QSignedData messages and associated QSignerinfo types. The server system includes a processor and instructions stored in non-transitory machine-readable media. The instructions are configured to cause the server system to receive a messageDigest attribute comprising a hash of content. The messageDigest attribute value is digitally signed with a first private key associated with the message computing system using a quantum-resistant signature algorithm to generate a quantum-resistant digital signature value. A QSignerinfo type is generated that includes at least one of a public key identifier of the public key and the quantum-resistant digital signature value. A QSignerinfo attribute is generated that identifies the QSignerinfo type. The QSignerinfo attribute is transmitted to a recipient. the recipient digitally signs the QSignerinfo attribute with a second private key associated with the recipient using a quantum-vulnerable signature algorithm to generate a double signature value. Origin authenticity of the double signature value can be determined by using a second public key of the recipient, the second public key of a second public/private key pair including the second private key. Data integrity of the content associated with the double signature can be verified via the hash of the content.

These and other features, together with the organization and manner of operation thereof, will become apparent from the following detailed description when taken in conjunction with the accompanying drawings, wherein like elements have like numerals throughout the several drawings described below.

Figure 1:
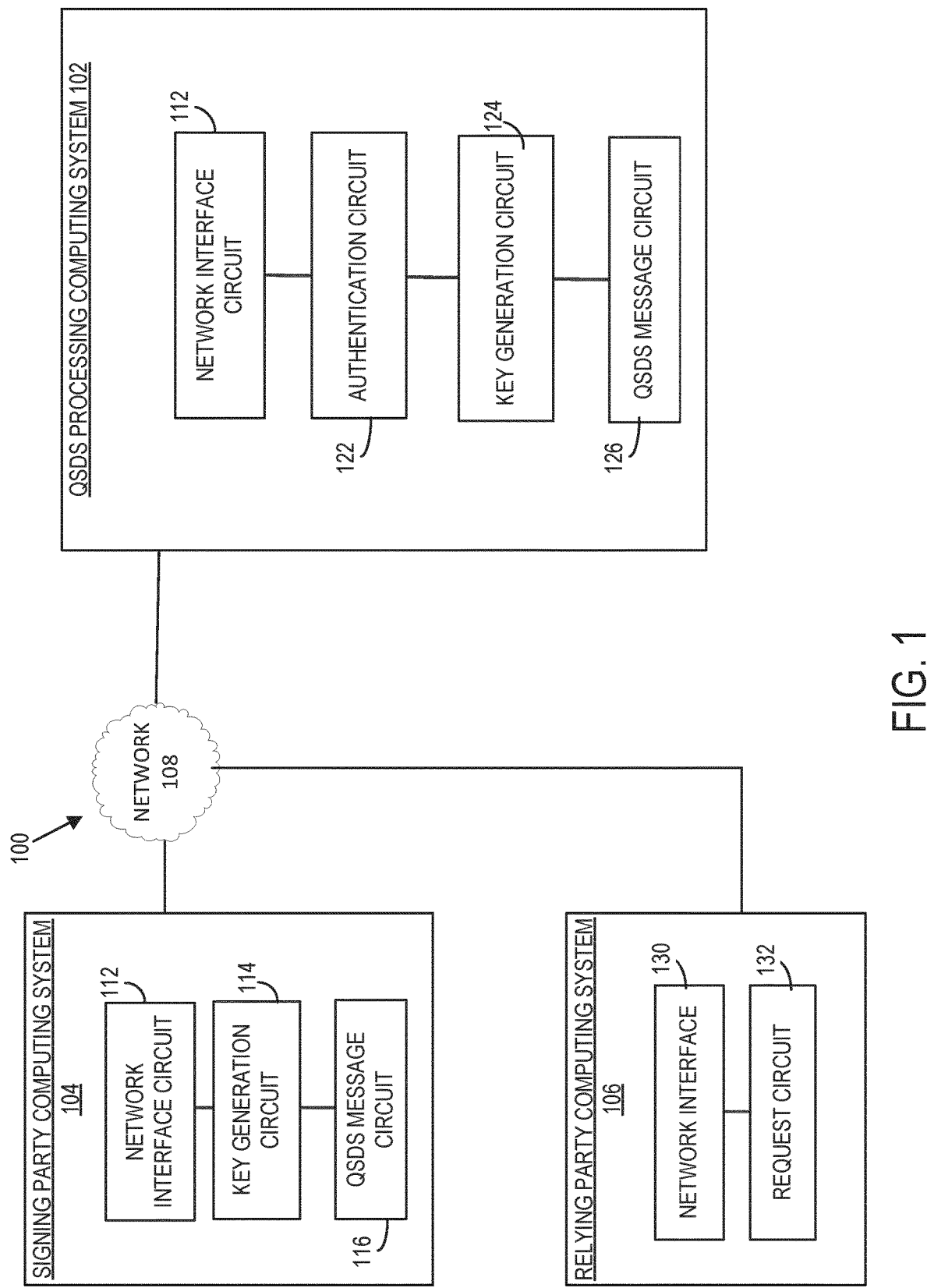
FIG. 1 is a schematic diagram of a QSDS message processing system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

The X9.73 Cryptographic Message Syntax ("CMS") standard message type SignedData is well known for its use in implementing secure email and many other applications and protocols, such as authenticated ATM encryption key updates, and the Visa and MasterCard Secure Electronic Transaction ("SET") protocol. Currently, the CMS message type SignedData is used for gaining third party assurance in the origin authenticity and data integrity of content signed by one or more parties. This digital signature algorithm is resistant to vulnerabilities and threats due to high improbability of an unauthorized user (e.g., attacker, hacker, etc.) possessing the computing power to determine the private signing key of a public-private key pair when presented with a signature and the public key associated with the signing key used to create the signature. For example, a brute-force approach to determine the private key of an RSA cryptosystem would require enumerating every possible key-pair such that, upon encountering a message known to be encrypted with a particular public-key, an attacker need merely lookup the associated private-key in order to decrypt that message. However, such a process has been approximated to take $5.95 \times 10^{211}$ years under current processing speeds and is impossible unless computers are built from something other than matter and occupy something other than space. Accordingly, advancements in quantum computing provide an exponential increase in processing power, rendering current digital signature schemes insecure as an attacker could determine the private signing key of a public-private key pair when presented with a signature and the public key associated with the signing key used to create the signature.

Various embodiments described herein relate to systems and methods for leveraging current cryptographic techniques linked to quantum resistant cryptographic techniques to create a dual signed message. Specifically, a message schema and associated processing for creating and verifying quantum-safe, double-signed content of any type or format, using hash-linked signed message. A quantum-resistant double signature ("QSDS") may be used to gain assurance in the integrity of the digital signature and origin authenticity and data integrity of the QSDS party's content during transfer and storage against current threats and future vulnerabilities due to advancements in quantum computing. The described QSDS process may utilize a wide variety of extensions to the cryptographic techniques defined in the X9.73 CMS standard. Beneficially, under the CMS message type SignedData, there may be more than one message signer, each using a different public-private key pair and signature algorithm. By utilizing the ability to sign each message (e.g., email) twice, a QSDS message links two signatures together, one signature using a current algorithm that is not "quantum-resistant" and a second signature that is "quantum-resistant," such that key compromises and signature forgeries can be detected both currently (against current computing systems) and in the future (against quantum computing systems). The QSDS message processing system (e.g., a message computing system) and a QSDS message provides an automated means of ensuring that signed documents with forged digital signatures created with compromised private keys can be detected by a recipient. As will be appreciated, the recipient may be an end user, a service provider, an intermediary computing system, a messaging entity, and the like.

In some arrangements, the digital signing is performed using SignedData cryptographic message syntax to generate a SignedData message, binding additional identifiers (e.g., OIDs) and other information to the enrollment event journal entry to create a signed message. Some embodiments utilize an OID as specified in the ISO/IEC 9834-1 standard. In some embodiments, the SignedData is the cryptographic message defined in the X9.73 financial industry security standard. In other embodiments, the IETF S/MIME or other signature standards that define a similar SignedData message (e.g., the W3C XML Digital Signature standard) may be used. After performing the SignedData signature verification, an auditing entity can verify the tokenized biometric data and biometric reference template identifier contained within the entry. The information needed for token processing can be contained in an attribute of the SignedData message that may be cryptographically bound to the enrollment event journal entry being signed under the same digital signature. In some arrangements, the digital signing is performed using SignedData cryptographic message syntax to generate a SignedData message, binding additional identifiers (e.g., OIDs) and other information to the re-enrollment event journal entry to create a signed message.

The QSDS message processing system provides technical solutions to computer-centric and internet-centric problems associated with conventional quantum-vulnerable digital signature systems. Specifically, the QSDS message processing system provides a relying party with all information needed to verify the digital signature and the ability to identify and verify the quantum-resistant digital signature without interrupting the transmission and verification of the messages under quantum-vulnerable processes. Beneficially, the QSDS message processing systems unique utilization of extensions to SignedData processing do not prohibit the use of currently deployed, quantum-vulnerable signature schemes. Rather, the QSDS message processing system relies on X9.73 CMS SignedData hash-linked message pairs, one message using current, quantum-vulnerable algorithms (e.g., RSA, ECDSA, etc.) and a paired message that uses quantum-safe signature algorithms. The QSDS message processing system provides a more efficient and effective authentication mechanism, alleviating processing power and network congestions, as the QSDS message processing system does not require moving the current signature systems to what are believed to be quantum-safe algorithms. Beneficially, the QSDS message processing system operates within the deployed signature schemes while allowing for the data to be proactively quantum-resistant while providing origin authenticity and data integrity to a message.

The QSDS message processing system provides technical solutions to computer-centric and internet-centric problems associated with conventional quantum-vulnerable digital signature systems by providing a "future proofing" of messages within the deployed signature schemes. Specifically, the QSDS message processing system provides strong protection without having to dedicate processing power or resources to converting digital signature systems to quantum-resistant signature algorithms. In other words, the QSDS message processing system allows already deployed, quantum-vulnerable signature schemes to continue to be used, while providing a necessary safeguard to protect into the future the integrity and authenticity of signed content against forged signatures stemming from key compromise. Further, the QSDS message processing system facilitates the migration and future deployment of quantum-safe algorithms as these become standardized and readily available in vendor solutions. The adoption and implementation of the QSDS message processing system can minimize disruption to current systems that require the security services provided by digital signatures. In this way the QSDS message processing system provides lower computational cost, making it ideal for protecting sensitive information in environments with bandwidth limitations (e.g., wireless mobile devices), high volumes of transactions (e.g., Internet commerce), or size or cost of storage issues (e.g., smart cards).

The QSDS message processing system also simplifies key management compared to existing systems. For example, the QSDS message processing system requires only a single linking attribute to be stored in the quantum-vulnerable signature message. With this approach, message processing performance is improved, there are fewer keys to manage, and the need to establish a shared secret with a recipient is eliminated. Also, the QSDS message processing system results in a much smaller message that is faster to process in transmission and in verification.

The problems above arise out of the use of computers and the Internet, because each problem involves processing power, bandwidth requirements, storage requirements, and information security, each of which is inherent to the use of computers and the Internet. The problems also arise out of the use of computers and the internet, because online communications, transactions, and payment services, and the ability to properly authenticate a signing party in an online communication, cannot exist without the use of computers and the Internet.

FIG. 1 is a schematic diagram of the QSDS message processing system 100, according to an example embodiment. The QSDS message processing system 100 allows for the generation and verification of quantum-resistant, double-signed content of a wide variety types or formats, using hash-linked signed messages. As described herein, the QSDS processing system 100 leverages the CMS message type SignedData, currently used for gaining third party assurance in the origin authenticity and data integrity of content, and pointers to sign the message with a quantum-resistant signature. The QSDS message processing system 100 includes a QSDS message processing computing system 102, a signing party computing system 104, and a relying party computing system 106. Each of the QSDS message processing computing system 102, signing party computing system 104, and relying party computing system 106 is in operative communication with the others via a network 108. The mechanisms allow for the generation and verification of a quantum-resistant digitally signed message coupled to content signed using a quantum-vulnerable signature algorithm. Specifically, a QSDS message makes it possible for a message to be signed using a current, quantum-vulnerable signature algorithm, while maintaining data integrity and origin authenticity against quantum computing systems. According to various arrangements, the QSDS message processing system 100 may be utilized to implement the methods of FIGS. 2-5. The signing party computing system 104 may be managed by the signing party of FIGS. 2 & 4; the QSDS message processing computing system 102 may be managed by the QSDS message processing computing system 102 of FIG. 2-5; and the relying party computing system 106 may be managed by the relying party of FIGS. 3 & 5.

The network 108 may include, for example, the Internet, cellular networks, proprietary cloud networks, telebiometric objects on the internet of things, and the like.

Generally, the signing party may use the QSDS message processing system 100 to digitally sign (e.g., cryptographically bind) content (e.g., record, mortgage, email, etc.) and link the original message with a quantum-resistant message containing at least the content of the original message for future verification by a relying party. The signing party uses a cryptographic hash function to produce a hash of the content-to-be-signed, which includes at least the content of the original message. Once a relying party has a QSDS message, the relying party may verify the digital signature under the signature algorithm (e.g., quantum-vulnerable) of the original message and under the signature algorithm (e.g., quantum-resistant) of the linked message. As will be appreciated, the relying party may only verify the linked message generated with the quantum-resistant signature algorithm if origin authenticity and data integrity of the original message could be compromised by a quantum computing system Additionally, if the public/private key pair used to sign is associated with a public key infrastructure ("PKI"), then the assurance of the identity of the signing party (e.g., biometric sample provider) is strengthened.

The signing party computing system 104 includes a network interface circuit 112, a key generation circuit 114, and a QSDS message circuit 116. The network interface circuit 112 is structured to facilitate operative communication between the signing party computing system 104 and other systems and devices over the network 108. The signing party computing system 104 may include smartphones, tablet computing systems, laptop computing systems, desktop computing systems, PDAs, smart watches, smart glasses, tablets, etc.

The key generation circuit 114 is structured to generate a public/private key pair for the digital signature of a quantum-vulnerable message. In some arrangements the public/private key pair is associated with a digital certificate in a PKI, such as the X.509 certificate. In those arrangements, a key pair is generated (the private/public key pair must be generated together as they are mathematically related), the private key signs the public key, and the pair is summited to the certificate authority ("CA") or the front end registration authority that will then generate that public key certificate. Alternatively, the private/public key pair could be issued with a commercial CA, such as one associated with a financial institution. In some arrangements, the signing party computing system 104 retrieves a public key certificate from the commercial certificate authority and uses the certificate to ascertain the public/private key pair. In other embodiments, the key generation circuit 114 generates an ephemeral public/private key pair that is not associated with a digital certificate in a PKI. In these embodiments, the public key can be included in the attributes of the quantum-vulnerable message, allowing a digital signature verifier to use the included public key component to verify message integrity. In these arrangements, the verifier will be able to verify message integrity (e.g., that it has not been modified), but will not gain origin authenticity assurance (e.g., know who signed the message and who possessed the private key component of the key pair).

The QSDS message circuit 116 is structured to generate the QSDS message by retrieving the private key from the key generation circuit 114 and digitally signing (and, therefore, cryptographically binding) the content, and facilitating the generation of the linked Qmessage (e.g., quantum-resistant) by the QSDS message processing computing system 102. The QSDS message circuit 116 manages the key generation circuit 114 and controls the generation of key pairs according to the desired QSDS message (e.g., whether the key is associated with a PKI, CA, etc.). Once a key pair is generated, the QSDS message circuit 116 determines what additional attributes (or OIDs) are to be bound to the message under the digital signature. The attributes can include, for example, a transaction identifier, a signing party identifier, a system generated time stamp, a public key, or a uniform resource identifier query string.

The QSDS message circuit 116 can accommodate and facilitate a wide variety of quantum-vulnerable digital signature methods to sign the original message. Generally, the QSDS message circuit 116 organizes the content, any attributes, and the private key used for the digital signature. In some arrangements, the digital signature is achieved using SignedData CMS to generate a SignedData message. With SignedData, there is no need to send the actual certificate along in the message; instead, an attribute or other identifier can indicate which certificate the recipient needs to verify the signature. For example, an attribute could include "certificate issuer DN and certificate serial number 123," which uniquely identifies the signing certificate. Beneficially, the QSDS message would be relatively small and still provide all of the information a relying party would need to verify the signature and other QSDS message contents. The hash limits processing and user issues of the un-hashed versions of the content, for example using Detached SignedData on a text file containing the content, where a hash of the text file is the input and the text file could be omitted from the SignedData message in order to limit the disruption in the operation of the text file.

The QSDS message circuit 116 facilitates the generation and linking of the original message and the quantum-resistant message by the QSDS message processing computing system 102. Depending on the arrangement, the QSDS message circuit 116 may digitally sign the original message and then facilitate the linking, or the QSDS message circuit 116 may facilitate the linking and then digitally sign the message. The generation of the QSDS message and linking of the quantum-vulnerable message and quantum-resistant message are expanded upon in greater detail below in method 200 of FIG. 2 and method 400 of FIG. 4.

The QSDS message processing computing system 102 also includes a network interface circuit 120, an authentication circuit 122, a key generation circuit 124, and a QSDS message circuit 126. The network interface circuit 120 is structured to facilitate operative communication between the QSDS message processing computing system 102 and other systems and devices over the network 108.

The authentication circuit 122 is structured to receive a request from a third party (e.g., relying party computing system 106) to verify the origin authenticity and data integrity of an original message by verifying the origin authenticity and data integrity of the linked (e.g., associated) quantum-resistant message. The verification process is described in greater detail below in method 300 of FIG. 3 and method 500 of FIG. 5.

The key generation circuit 124 is structured to generate a public/private key pair for the digital signature of a quantum-vulnerable message. In some arrangements the public/private key pair is associated with a digital certificate in a PKI, such as the X.509 certificate. In those arrangements, a key pair is generated (the private/public key pair must be generated together as they are mathematically related), the private key signs the public key, and the pair is summited to the CA or the front end registration authority that will then generate that public key certificate. Alternatively, the private/public key pair could be issued with a commercial CA, such as one associated with a financial institution. In some arrangements, the signing party computing system 104 retrieves a public key certificate from the commercial CA and uses the certificate to ascertain the public/private key pair. In other embodiments, the key generation circuit 124 generates an ephemeral public/private key pair that is not associated with a digital certificate in a PKI. In these embodiments, the public key can be included in the attributes of the quantum-vulnerable message, allowing a digital signature verifier to use the included public key component to verify message integrity. In these arrangements, the verifier will be able to verify message integrity (e.g., that it has not been modified), but will not gain origin authenticity assurance (e.g., know who signed the message and who possessed the private key component of the key pair).

The QSDS message circuit 126 is structured to receive an original message by the signing party computing system 104, generate the linked quantum-resistant message, and transmit the linking identifier to the signing party computing system 104. The QSDS message circuit 126 is structured to generate the linked quantum-resistant message by retrieving the private key from the key generation circuit 114, digitally signing (and, therefore, cryptographically binding) the content, and facilitating the generation of the linked Qmessage (e.g., quantum-resistant). The QSDS message circuit 126 manages the key generation circuit 124 and controls the generation of key pairs according to the desired QSDS message (e.g., whether the key is associated with a PKI, CA, etc.). Once a key pair is generated, the QSDS message circuit 126 determines which quantum-resistant signature algorithm to use. The QSDS message circuit 126 can accommodate and facilitate a wide variety of quantum-resistant digital signature methods to sign the original message. For example, the algorithm can include: Lattice-Based Polynomial Public Key Establishment Algorithm, X9.98, and hash-based one-time signatures. The hash-based one-time signatures include the Lamport-Diffie or Winternitz signatures that rely upon the one-way property of hash functions to build a signature scheme which can be used many times to sign using so a binary hash tree (e.g., merkle tree).

The QSDS message circuit 126 facilitates the generation and linking of the original message and the quantum-resistant message by the QSDS message processing computing system 102. Depending on the arrangement, the QSDS message circuit 126 may receive a digitally signed original message and then facilitate the linking, or the QSDS message circuit 126 may facilitate the linking and then transmit the lining identifier to be digitally signed by the signing party computing system 104. The generation of the QSDS message and linking of the quantum-vulnerable message and quantum-resistant message are expanded upon in greater detail below in method 200 of FIG. 2 and method 400 of FIG. 4.

The relying party computing system 106 includes a network interface circuit 130 and a request circuit 132. Generally, the relying party computing system 106 receives the original, QSDS message from the signing party computing system 104 and verifies the origin authenticity and data integrity of the original message. Additionally, the relying party computing system 106 verifies the origin authenticity and data integrity of the linked quantum-resistant message in order to verify that the original message is uncompromised by a quantum computing system. The network interface circuit 130 is structured to facilitate operative communication between the relying party computing system 106 and other systems and devices over the network 108.

The request circuit 132 is structured to facilitate the verification of the original message and linked message on the QSDS message processing computing system 102. In some arrangements, there is an application or web browser on the computing system 106 that facilitates this process. For example, upon receiving the QSDS message, the relying party computing system 106 automatically begins verification of the signature, transfers a quantum-authentication request to the QSDS message processing computing system 102, and receives the quantum verification result from the QSDS message processing computing system 102. The verification process is described in greater detail below in method 300 of FIG. 3 and method 500 of FIG. 5.

Figure 2:
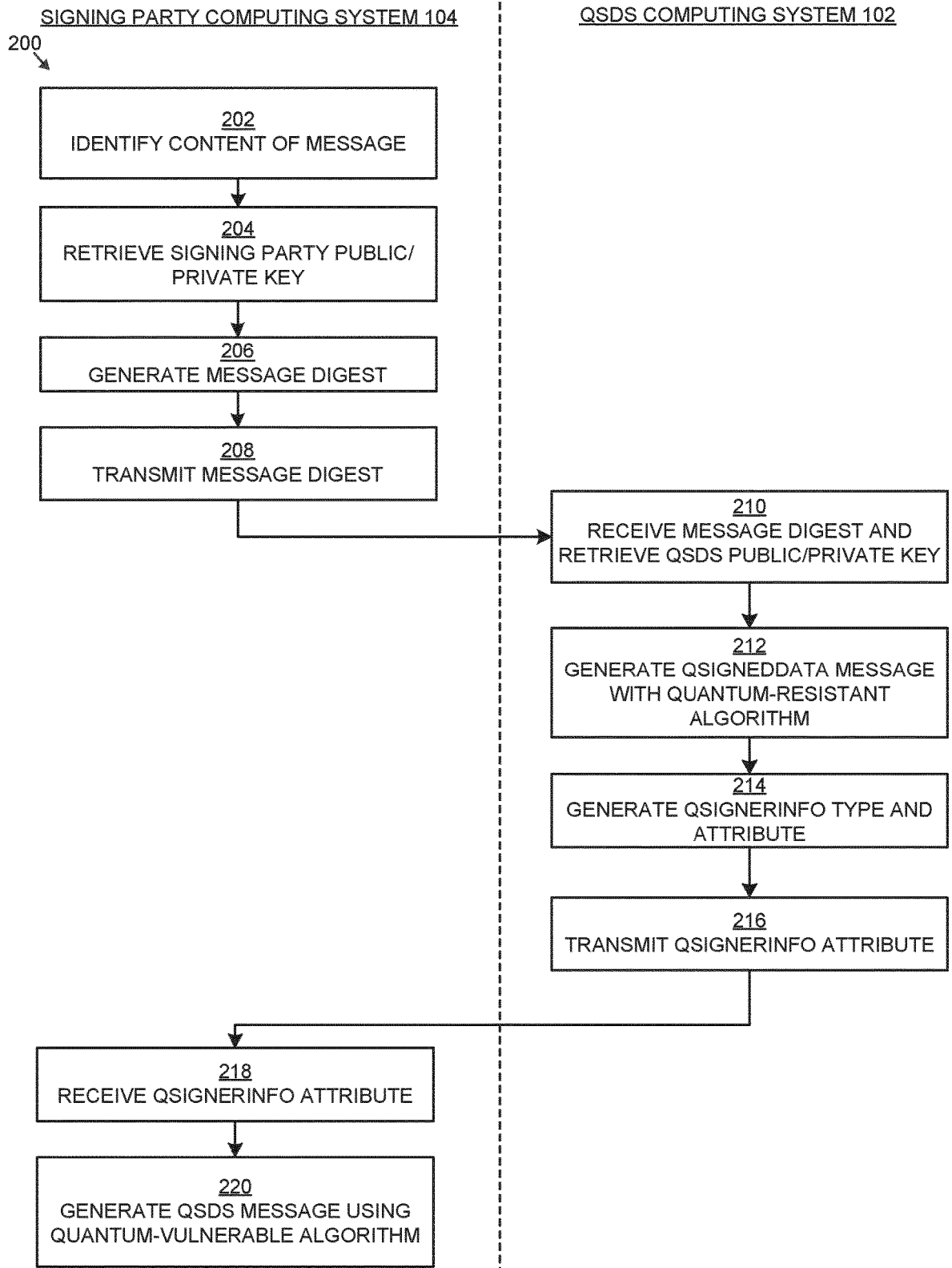
FIG. 2 is a flow diagram illustrating a method of generating a QSDS message, according to an example embodiment.

Referring to FIG. 2, a flow diagram illustrating a method 200 of generating a QSDS message is shown, according to an example embodiment. The method 200 involves linking two public-private key pairs and signature algorithms, one using a current algorithm that is not "quantum-resistant" and another using a signature algorithm that is "quantum-resistant". Beneficially, the QSDS message allows for key compromises and signature forgeries to be detected. The method 200 may be performed by a back-end system. As shown in FIG. 2, the method 200 is performed by a signing party and a QSDS message processing system. In some arrangements, the signing party may be one that operates the signing party computing system 104 of FIG. 1 and the QSDS message processing system may be one that operates the QSDS message processing computing system 102 of FIG. 1. However, the method 200 may be similarly performed by other systems and devices. The generated QSDS message may be defined by the Internet Engineering Task Force ("IETF") S/MIME CMS standard or the X9.73 CMS standard, with either standard supporting multiple signers, message digest and signature algorithms, as well as signed attributes of any type or format.

The signing party computing system's 104 method 200 of generating a QSDS message begins at 202 when the signing party computing system 104 wants to sign content (e.g., document, email, communication, etc.) with a current, quantum-vulnerable algorithm, such as ECDSA. In some embodiments, the signing party computing system 104 will identify the chosen digest algorithm and signature algorithm in a value of a Signerinfo attribute for inclusion in the eventual QSDS message.

At 204, the signing party computing system 104 retrieves a public/private key pair. In some arrangements, the public/private key pair is associated with a digital certificate in a PKI, for example the X.509 certificate. In those arrangements, a key pair is generated (the private/public key pair must be generated together as they are mathematically related), the private key signs the public key, and the pair is summited to the certificate authority ("CA") or the front-end registration authority that will then generate that public key certificate. Alternatively, the private/public key pair retrieved can be one issued with a commercial CA. In some embodiments, the signing key is identified indirectly, using the SignerIdentifier component of type Signerinfo attribute to indicate an associated public key or public key certificate to a relying party. As discussed in greater detail below in method 300 of FIG. 3, the relying party computing system 106 can use the PKI information to verify the signature and perform path validation to determine if the signing party computing system 104 should be trusted.

At 206, the signing party generates a CMS messageDigest attribute. The CMS messageDigest attribute is generating by the signing party computing system 104 computing a cryptographic hash on the content-to-be-signed (e.g., the content), which is located in the SignedData message Content field, and any associated attributes carried in type SignedData. The hash is generated using a suitable cryptographic hash algorithm. A cryptographic hash algorithm or hash function is a one-way function that takes an arbitrary input string and generates a fixed-length output. The resulting output can be referred to as a hash, as hash value, or a message digest. Small changes to the input data result in large, unpredictable changes to the hash value. Accordingly, the hash of the cipher text can be used to verify. Additional parameters or attributes may be specified by the signing party computing system 104. In some arrangements, a time stamp token ("TST") is included in the attributes. A TST is generated by sending the hash to a time stamp authority ("TSA"), which cryptographically binds the hash to a time stamp. In some arrangements, a Security Assertion Markup Language ("SAML") assertion is included in "attributes."

While the foregoing embodiments are described as being cryptographically protected in CMS X9.73 messages, such as SignedData and NamedKey EncryptedData, the QSDS message processing system 100 may incorporate additional asymmetric cryptography (e.g. Signcryption, X9.73, ISO/IEC 29150), digital signatures (e.g. RSA, X9.31, DSA, FIPS 186-4, ECDSA, X9.62) and/or known encryption algorithms (e.g. AES 256, FIPS 197), keyed hash message authentication code (HMAC) algorithm (FIPS 198 1)) using hash algorithms (e.g., SHA 256, FIPS 180 4) or suitable key derivation algorithms (e.g. SHA 256, FIPS 180 4).

At 208, the signing party computing system 104 transmits the messageDigest attribute to the QSDS message processing computing system 102. As will be appreciated, the signing party computing system 104 may generate and transmit to the QSDS message processing computing system 102 any data type that identifies a hash of the document to-be-signed, including a SignedAttributes object or simply a raw hash value.

At 210, the QSDS message processing computing system 102 receives the messageDigest attribute from the signing party computing system 104 to begin generating a QSignedData message. In some embodiments, the QSDS message processing computing system 102 might use a different message digest algorithm than the signing party computing system 104. As will be appreciated, the QSignedData message is the message with the QSDS message processing computing system 102 that is linked to the QSDS message. The QSDS message processing computing system 102 retrieves a public/private key pair. In some arrangements, the public/private key pair is associated with a digital certificate in a PKI, such as the X.509 certificate. In those arrangements, a key pair is generated (the private/public key pair must be generated together as they are mathematically related), the private key signs the public key, and the pair is summited to the CA or the front-end registration authority that will then generate that public key certificate. Alternatively, the private/public key pair retrieved can be one issued with a commercial CA.

At 212, the QSDS message processing computing system 102 generates the QSignedData message. The QSignedData message is generated using the messageDigest attribute, received from the signing party computing system 104, as the content-to-be-signed. The QSDS message processing computing system 102 digitally signs the content using the private key of the QSDS message processing computing system 102 and a quantum-resistant signature algorithm to generate a quantum-resistant QSignedData message. The quantum-resistant algorithms can include, for example, Lattice-Based Polynomial Public Key Establishment Algorithm, X9.98, and hash-based one-time signatures. The hash-based one-time signatures include the Lamport-Diffie or Winternitz signatures that rely upon the one-way property of hash functions to build a signature scheme which can be used many times to sign using a binary hash tree (e.g., merkle tree). In some arrangements, the QSDS message processing computing system 102 is the sole signer of the QSignedData message.

At 214, the QSDS message processing computing system 102 generates a QSignerinfo type and a qSignerInfo attribute. The QSignerinfo type includes the public key identifier of the public key or certificate associated with the public/private key pair of the QSDS message processing computing system 102 and the resulting signature value. The qSignerInfo attribute is linked with the QSignedData message. An exemplary QSignerinfo attribute may be:

```
QSignerInfo ATTRIBUTE: : = SEQUENCE {
    version             CMSVersion,
    sid                 QSignerIdentifier,
    digestAlgorithm     DigestAlgorithmIdentifier,
    signedAttrs         [0] SignedAttributes OPTIONAL,
    signatureAlgorithm  Quantum SignatureAlgorithmIdentifier,
    signature           SignatureValue,
    unsignedAttrs       [1] UnsignedAttributes OPTIONAL
}
```

At 216, the QSDS message processing computing system 102 transmits the qSignerInfo attribute to the signing party computing system 104. At 218, the signing party computing system 104 receives the qSignerInfo attribute from the QSDS message processing computing system 102 and includes the qSignerInfo attribute in a value of SignedAttributes. The value of SignedAttributes includes the messageDigest attribute sent to the QSDS message processing computing system 102 at 208, a contentType attribute, and any other attributes of any type or format of the signing party's choosing.

At 220, the signing party computing system 104 generates the QSDS message. The QSDS message is generated by digitally signing the SignedAttributes value using the private key of the signing party computing system. The resulting SignedAttributes value includes the qSignerInfo, the messageDigest attribute value, content type (e.g., contentType attribute), and the digital signature. Accordingly, the resulting QSDS message (e.g., the SignedData message including SignedAttributes value that includes the qSignerInfo attribute) includes a hash of the content, which is the same hash signed by the QSDS service. The QSDS message is signed using a current, quantum-vulnerable, algorithm. As will be appreciated, the QSDS message is linked to the QSignedData message that is signed by a quantum-resistant algorithm. If an attacker gains possession of the private key of the signing party computing system 104 and modifies and re-signs the content (e.g., impersonates the signing party), the QSDS message processing computing system 102 would be able to detect the change due to the inclusion and linkage of the QSignerinfo attribute in the QSDS message.

In some embodiments, and as used below in method 300 of FIG. 3, the linked qSignerInfo attribute is described as a first qSignerInfo in reference to the qSignerInfo attribute in the QSDS message and is described as a second QSignerinfo in reference to the QSignerinfo type in the QSignedData message. As will be appreciated, in this generation of the QSDS message, the second QSignerinfo is generated first by the QSDS message processing computing system 102 and transmitted to the signing party computing system 104. Beneficially, the generation and verification, described in greater detail below in method 300 of FIG. 3, of the QSDS message prevents attacks by quantum computing techniques on vulnerable signature schemes.

Figure 3:
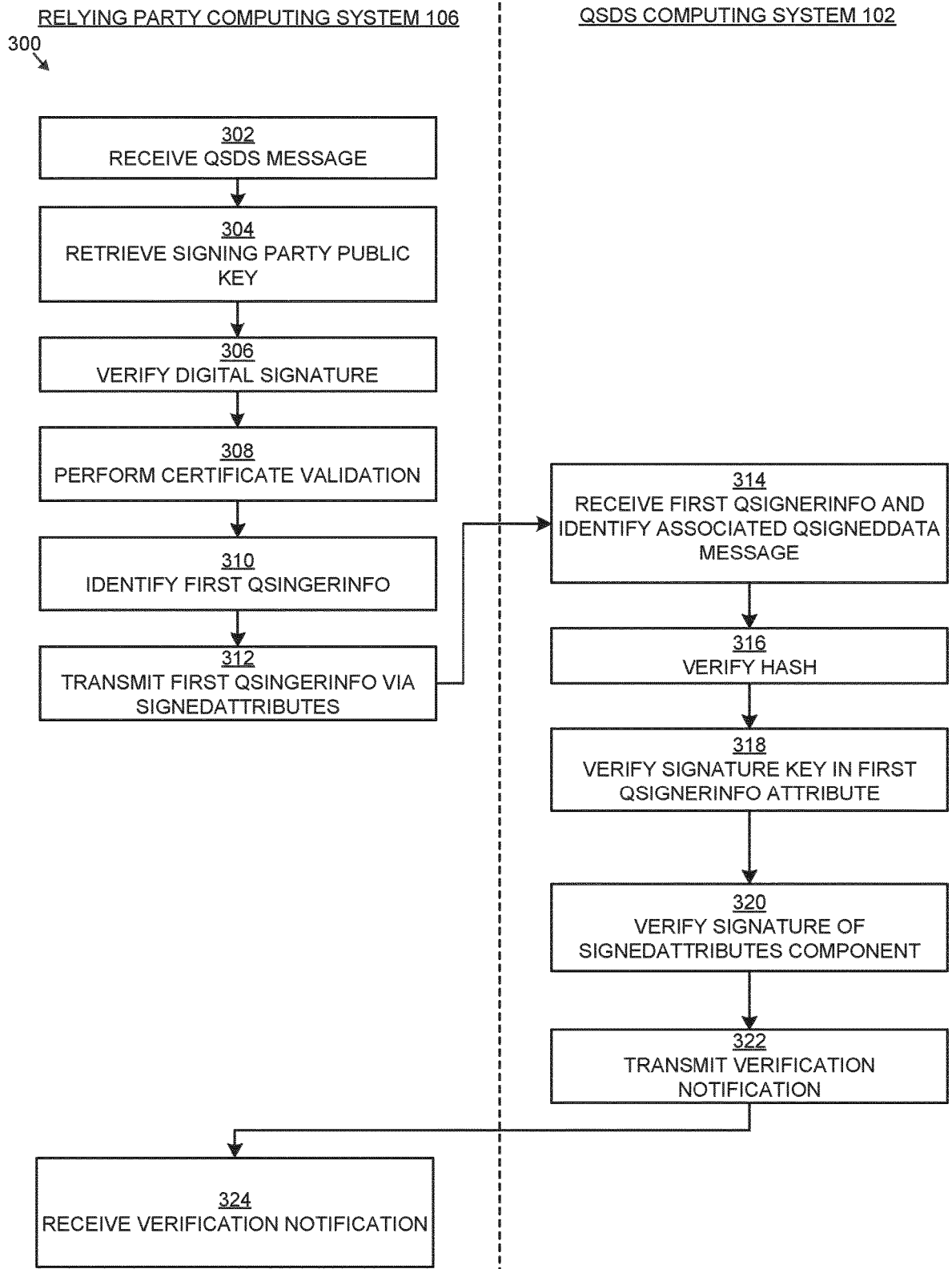
FIG. 3 is a flow diagram illustrating a method of validating the generated QSDS message of FIG. 2, according to an example embodiment.

Referring to FIG. 3, a flow diagram illustrating a method 300 of validating a QSDS message is shown, according to an example embodiment. The method 300 is described in connection with a recipient party (e.g., message recipient) that receives a QSDS message from a signing party. According to various embodiments, the recipient is an entity that manages the relying party computing system 106 of FIG. 1, and the QSDS message processing system may be one that operates the QSDS message processing computing system 102 of FIG. 1. However, the method 300 may be similarly performed by other systems and devices. As will be appreciated, if there are no threats of quantum computing compromise of the public/private key pair, the QSDS message verification would follow a current verification and path validation rules for validating a SignedData message.

The method 300 begins at 302 when the relying party computing system 106 receives a QSDS message. The relying party computing system 106 may receive the QSDS message shortly after generation of the QSDS message (e.g., email, communication, etc.), or it may be received at a time after generation of the QSDS message (e.g., after an event, a mortgage, etc.). The QSDS message may be received by the signing party computing system 104 directly, through a third-party entity, or through a series of entities (e.g., passed along). The QSDS message provides the recipient with all information needed to perform certificate path validation to gain assurance that the public key certificate of the signing party computing system 104 is trusted.

At 304, the relying party computing system 106 retrieves the public key of the signing party computing system 104 to verify the digital signature of the QSDS message. In some arrangements, the key pair is associated with a digital certificate in a PKI or CA that allows the relying party computing system 106 (or any other entity) to look up and retrieve the public key associated with the signing party computing system 104. In other arrangements, the relying party computing system 106 could examine a public key component in the QSDS message to verify message integrity but would be unable to get origin authenticity assurance.

At 306, the relying party computing system 106 verifies the digital signature of the signing party computing system 104 on the digitally QSDS message. The verification process includes the relying party computing system 106 generating a cryptographic hash of the content (e.g., messageDigest) identified in the digitally signed QSDS message. The hash is signed using the public key of the signing party computing system 104, a signature algorithm, and any additional parameters. If the signature is valid, the result will be the same as the value carried in the digitally signed QSDS message and the message is verified at 306. If signature fails, the result will not be the same as the value carried in the digitally signed QSDS message and the message is not verified. As will be appreciated, if the digital signature fails, the QSDS message maybe altered, either accidently or fraudulently.

At 308, the relying party computing system 106 performs a certificate path validation to gain assurance that the public key certificate of the signing party computing system 104 is trusted. In one arrangement, path validation is performed on the signer certificate chain back to a trust anchor. The recipient determines whether the QSDS message and hash sent to the recipient is valid and trusted (e.g., that the signature itself is valid and that the certificates in the path are not on a revocation list). In some arrangements, a QSDS message includes PKI, CRLs, CA, or similar information for the recipient to track the signature back to a trusted anchor/ entity. For example, the recipient verifies with the public or private service provider associated with the key pair used that the public key certificate is valid. In other arrangements, the recipient can attempt to verify the signed version of the hash that the recipient has received from the sender by using the public key of the signing party computing system 104. The verification procedure uses the public key of the signing party computing system 104 in a mathematical operation to determine whether the signature was indeed created from the same hash using the correct private key. If the verification function is successful, the signed version of the hash will be proven to have originated from the hash that the relying party computing system 106 has produced by applying the hash function directly to the message. A successful verification operation therefore allows the relying party computing system 106 to confirm the true authorship of the message.

As will be appreciated, the relying party computing system 106 following current CMS processing (verification and path validation) rules would be able to detect a change in the document under current (e.g., non-quantum) computing systems. The QSDS message is able to be processed as if it were an ordinary (e.g., current signature algorithms) SignedData message and there would be no disruption caused by this invention to existing deployments. However, with quantum computing systems, a relying party (e.g., relying party computing system 106) who verifies the signature on the QSDS message following current CMS processing rules would be unable to detect an alteration of the document or the signature, as the signature would appear to be valid because it was signed by the unauthorized party who had gained access to the private signing key of the signing party computing system 104. In other words, the primary threat to current digital signature schemes by quantum computing techniques is impersonation of users (e.g., signing party) assumed to be in sole possession of their private signing keys.

At 310, verification of the QSDS message to gain assurance in the digital signature against compromise by a quantum computing system begins with the relying party computing system 106 identifying the first qSignerInfo included in the QSDS message SignedAttributes object. If the first qSignerInfo is absent, the message is not verified. At 312, the relying party computing system 106 transmits the SignedAttributes value that includes the first qSignerInfo, the message digest, content type, and digital signature to the QSDS message processing computing system 102.

At 314, the QSDS message processing computing system 102 receives the first qSignerInfo from the relying party computing system 106 and queries a database for a QSignedData message whose content field contains the signed messageDigest attribute value. In other words, the QSDS message processing computing system 102 is using the received first qSignerInfo to locate the QSignedData message that is linked to the QSDS message. If a matching QSignedData message cannot be found, the QSDS message processing computing system 102 can assume the digital signature on the QSDS message may be invalid or corrupt and should not be trusted. Accordingly, if the provided first qSignerInfo does not match a QSignedData message, the message is not verified. In those situations, the QSDS message processing computing system 102 may transmit a verification failed message to the relying party computing system 106.

At 316, the QSDS message processing computing system 102 generates a fresh cryptographic hash of the content (e.g., messageDigest) identified in the SignedAttributes that includes the first qSignerInfo provided by the relying party computing system 106. The QSDS message processing computing system 102 computes a hash over the messageDigest attribute value using the same message digest algorithm used to create the QSignedData message (e.g., at 220 of FIG. 2). The QSDS message processing computing system 102 verifies the fresh cryptographic hash of the content (e.g., messageDigest) by comparing it to the hash in the second QSignerinfo SignedAtrributes messageDigest value of the QSignedData message. If the hash in the messageDigest of the QSignedData matches the freshly generated hash in the messageDigest of the first qSignerInfo, the verification process continues. If the hash in the provided messageDigest of the QSDS message does not match the freshly generated hash QSignedData message, the message is not verified. In those situations, the QSDS message processing computing system 102 may transmit a verification failed message to the relying party computing system 106.

At 318, the QSDS message processing computing system 102 verifies the signature key in the first qSignerInfo. The QSDS message processing computing system 102 compares the signature key identified in the first qSignerInfo to the signature key in the second QSignerinfo of the QSignedData message. If the signature key in the first qSignerInfo matches the signature key in the second QSignerinfo, the verification process continues. In some embodiments, the signature key is the public key of the QSDS message processing computing system 102 that is paired with the private key used to digitally sign the QSignedData message. If signature key in the first qSignerInfo does not match the signature key in the second QSignerinfo, the message is not verified. In those situations, the QSDS message processing computing system 102 may transmit a verification failed message to the relying party computing system 106.

At 320, the QSDS message processing computing system 102 verifies the signature of the SignedAttributes component of the first qSignerInfo. The verification process includes the QSDS message processing computing system 102 generating a cryptographic hash of the content (e.g., messageDigest, content) identified in the SignedAttributes component of the first qSignerInfo. The hash is signed using the private key of the QSDS message processing computing system 102, the signature algorithm used to previously generate the QSignedData message (e.g., at 220 in method 200 of FIG. 2), and any additional parameters. If the signature is valid, the resulting, freshly signed SignedAttributes component of the first qSignerInfo will be the same as the value carried in the digitally signed QSignedData message and the message is verified. If signature fails, the result will not be the same as the value carried in the digitally signed QSDS message and the message is not verified. If the digital signature verification fails, the QSDS message may have been altered, either accidently or fraudulently.

At 322, the QSDS message processing computing system 102 transmits a successful verification notification to the relying party computing system 106. A successful verification operation allows the recipient to confirm at 324 the true authorship of the message and to confirm that the message has not been altered or compromised by quantum computing systems.

Figure 4:
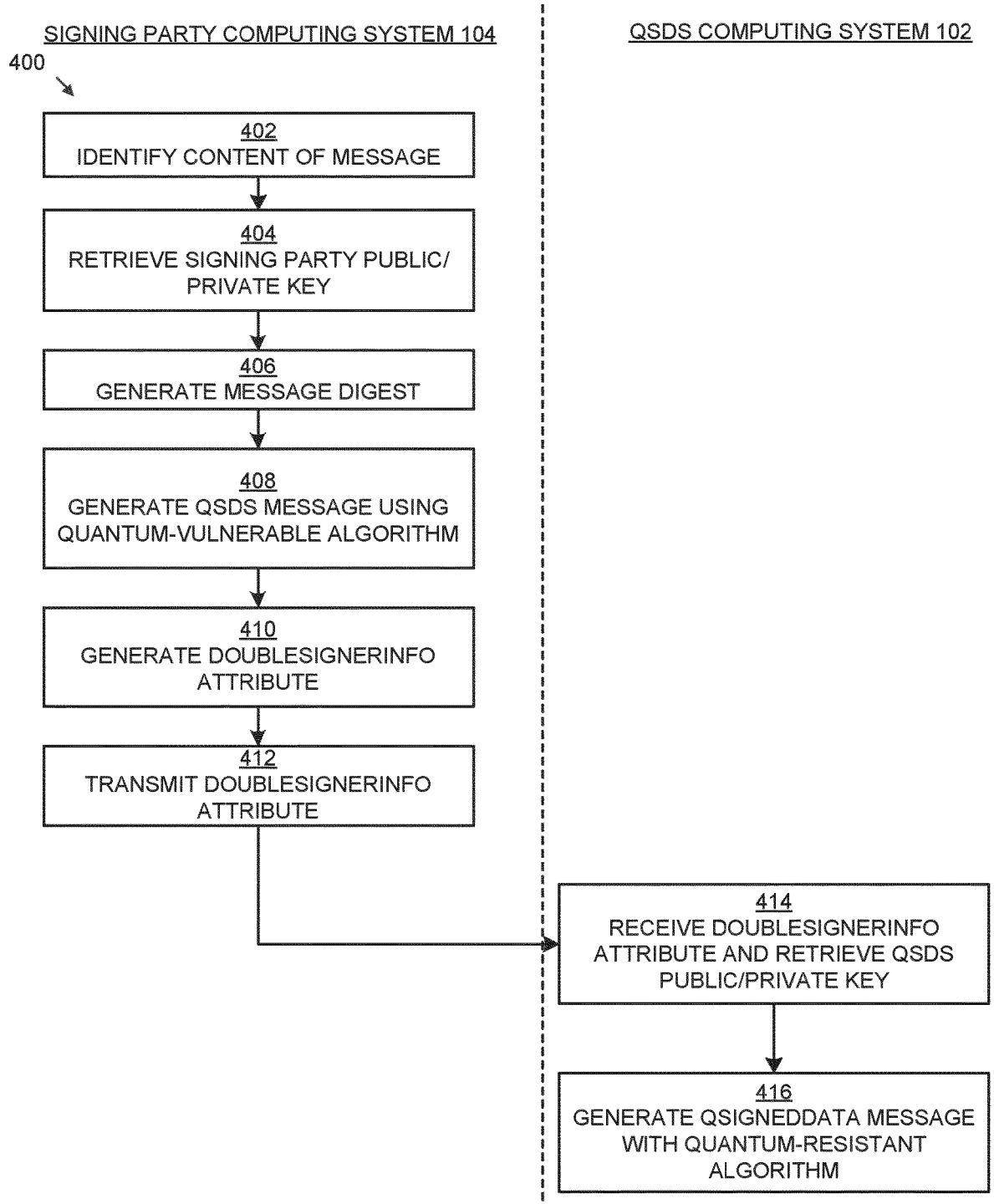
FIG. 4 is a flow diagram illustrating a method of generating a QSDS message, according to another example embodiment.

Referring to FIG. 4, a flow diagram illustrating a method 400 of generating a QSDS email message is shown, according to an example embodiment. The method 400 involves linking two public-private key pairs and signature algorithms, one using a current algorithm that is not quantum-resistant and another using a signature algorithm that is quantum-resistant. Beneficially, the QSDS message allows for key compromises and signature forgeries to be detected. The method 400 may be performed by a back-end system. As shown in FIG. 4, the method 400 is performed by a signing party and a QSDS message processing system. In some arrangements, the signing party may be one that operates the signing party computing system 104 of FIG. 1 and the QSDS message processing system may be one that operates the QSDS message processing computing system 102 of FIG. 1. However, the method 400 may be similarly performed by other systems and devices. The generated QSDS message may be defined by the Internet Engineering Task Force ("IETF") S/MIME CMS standard or the X9.73 CMS standard, with either standard supporting multiple signers, message digest and signature algorithms, as well as signed attributes of any type or format. While the method 400 is described in relation to generating a QSDS email message, other forms of content may be signed to generate a QSDS message. The method 400 of generating a QSDS email message (herein referred to as a "QSDS message" in relation to method 400) is similar to the method 200 of generating a QSDS message of FIG. 2.

The signing party computing system's 104 method 400 of generating a QSDS message begins at 402 when the signing party computing system 104 wants to sign an email with content (e.g., document, attachment, communication, etc.) with a current, quantum-vulnerable algorithm, such as RSA. Currently, SignedData is widely used to send and receive secure email. Beneficially, this allows for there to be more than one message signer, each using a different public-private key pair and signature algorithm.

At 404, the signing party computing system 104 retrieves a public/private key pair. In some arrangements, the public/private key pair is associated with a digital certificate in a PKI, for example the X.509 certificate. In those arrangements, a key pair is generated (the private/public key pair must be generated together as they are mathematically related), the private key signs the public key, and the pair is summited to the CA or the front-end registration authority that will then generate that public key certificate. Alternatively, the private/public key pair retrieved can be one issued with a commercial CA. In some embodiments, the signing key is identified indirectly, using the SignerIdentifier component of type Signerinfo attribute to indicate an associated public key or public key certificate to a relying party. As discussed in greater detail below, in method 300 of FIG. 3, the relying party computing system 106 can use the info to verify the signature and perform path validation to determine if the signing party computing system 104 should be trusted.

At 406, the signing party generates a CMS messageDigest attribute. The CMS messageDigest attribute is generated by the signing party computing system 104 computing a cryptographic hash on the content-to-be-signed (e.g., the content), which is located in the SignedData message Content field, and any associated attributes carried in type SignedData. The hash is generated using a suitable cryptographic hash algorithm. A cryptographic hash algorithm or hash function is a one-way function that takes an arbitrary input string and generates a fixed-length output. The resulting output can be referred to as a hash, as hash value, or a message digest. Small changes to the input data result in large, unpredictable changes to the hash value. Accordingly, the hash of the cipher text can be used to verify. Additional parameters or attributes may be specified by the signing party computing system 104.

At 408, the signing party computing system 104 generates the QSDS message. The QSDS message is generated by digitally signing the SignedAttributes value and a quantumDSigned attribute using the private key of the signing party computing system. The QSDS message is signed using a quantum-vulnerable signature algorithm. The SignedAttributes value includes the messageDigest and a contentType attribute. The quantumDSigned attribute contains a unique identifier that indicates the QSDS message is double-signed and allows a mail agent to locate the associated signer when the signature on the message is later verified, for example, in a verification method 500 of FIG. 5, described in greater detail below. As will be appreciated, the signing party computing system 104 would have a connection (e.g., enrolled in a service with) with the QSDS message processing computing system 102 or know of a process for generating a proper object identifier and other information in the quantumDSigned attribute. An exemplary quantumDSigned attribute may be:

```
quantumDSigned ATTRIBUTE : : = {
    WITH SYNTAX QuantumSignedDataID ID id-
    QuantumSignedDataID
}
    id-QuantumSignedDataID OBJECT IDENTIFIER : : = { 1 2 3 4
    13 }
    QuantumSignedDataID : : = OCTET STRING - - A globally
unique value - -
```

At 410, the signing party computing system 104 generates a doubleSignerInfo attribute. The doubleSignerInfo attribute contains a Signerinfo attribute of the associated signing party and the quantumDSigned attribute used at 408. The Signerinfo attribute includes the signing key, digest algorithm, and signature algorithm used by the signing party computing system 104. The signing key is identified indirectly, using the SignerIdentifier component of type Signerinfo attribute to indicate an associated public key or public key certificate a relying party can use to verify the signature and perform path validation to determine if the signature should be trusted. An exemplary SignerInfo attribute and quantumDSigned attribute may be defined as:

```
SignerInfo : : = SEQUENCE {
    version              CMSVersion,
    sid                  SignerIdentifier,
    digestAlgorithm      DigestAlgorithmIdentifier,
    signedAttrs          [0] SignedAttributes OPTIONAL,
    signatureAlgorithm   SignatureAlgorithmIdentifier,
    signature            SignatureValue,
    unsignedAttrs        [1] UnsignedAttributes OPTIONAL
}
doubleSignerInfo ATTRIBUTE : : = {
    WITH SYNTAX SignerInfo ID id-DoubleSignerInfo
}
id-DoubleSignerInfo OBJECT IDENTIFIER : : = { 1 2 3 4 43 }
```

At 412, the signing party computing system 104 transmits the doubleSignerInfo attribute to the QSDS message processing computing system 102. As will be appreciated, the doubleSignerInfo attribute, by way of the SignedAttributes object in the Signerinfo attribute, includes the message digest and digest algorithm, thereby allowing subsequent verification of the original content of the email that is signed.

At 414, the QSDS message processing computing system 102 receives the doubleSignerInfo attribute and retrieves a public/private key pair. In some arrangements, the public/private key pair is associated with a digital certificate in a PKI, for example the X.509 certificate. In those arrangements, a key pair is generated (the private/public key pair must be generated together as they are mathematically related), the private key signs the public key, and the pair is summited to the CA or the front-end registration authority that will then generate that public key certificate. Alternatively, the private/public key pair retrieved can be one issued with a commercial CA.

At 416, the QSDS message processing computing system 102 generates a QSignedData message. The QSignedData message is generated by digitally signing a SignedAttributes value that includes the doubleSignerInfo attribute received at 412. As will be appreciated, through the inclusion of the doubleSignerInfo attribute, the QSignedData message includes the quantumDSigned attribute that indicates the message is double-signed and identifies the associated signing party. The QSDS message processing computing system 102 digitally signs the content using the private key of the QSDS message processing computing system 102 and a quantum-resistant signature algorithm to generate a quantum-resistant QSignedData message. The quantum-resistant signature algorithm can include, for example, Lattice-Based Polynomial Public Key Establishment Algorithm, X9.98, and hash-based one-time signatures.

At the completion of 416, the QSDS message has two Signerinfo attribute values that, while similar, each uniquely identifies the associated signers (e.g., the signing party 104 and the QSDS message processing computing system 102) linked through the quantumDSigned attribute. For clarity, the linked Signerinfo attribute will be described as a first Signerinfo attribute in reference to the Signerinfo attribute in the QSDS message and will be described as a second Signerinfo attribute in reference to the Signerinfo attribute in the QSignedData message. Beneficially, the signature information of the signing party computing system 104 is cryptographically protected by the quantum-resistant signature of the QSDS message processing computing system 102 on the QSignedData message. In other words, the quantum-resistant signature of the QSDS message processing computing system 102 is associated with, but not cryptographically bound to, the signature information of the signing party computing system 104. For example, if an attacker calculates (or possess) the private key of the signing party computing system 104, the attacker may alter the signed content, recreate the messageDigest attribute, and forge a new signature on the message. Due to the linkage of the second Signerinfo attribute in the QSignedData message and the first Signerinfo attribute in the original QSDS message through the quantumDSigned attribute, the alteration of the messageDigest attribute would be detected due to the mismatching Signerinfo. Beneficially, the generation and verification, described in greater detail below in method 500 of FIG. 5, of the QSDS message prevents attacks by quantum computing techniques on vulnerable signature schemes.

Figure 5:
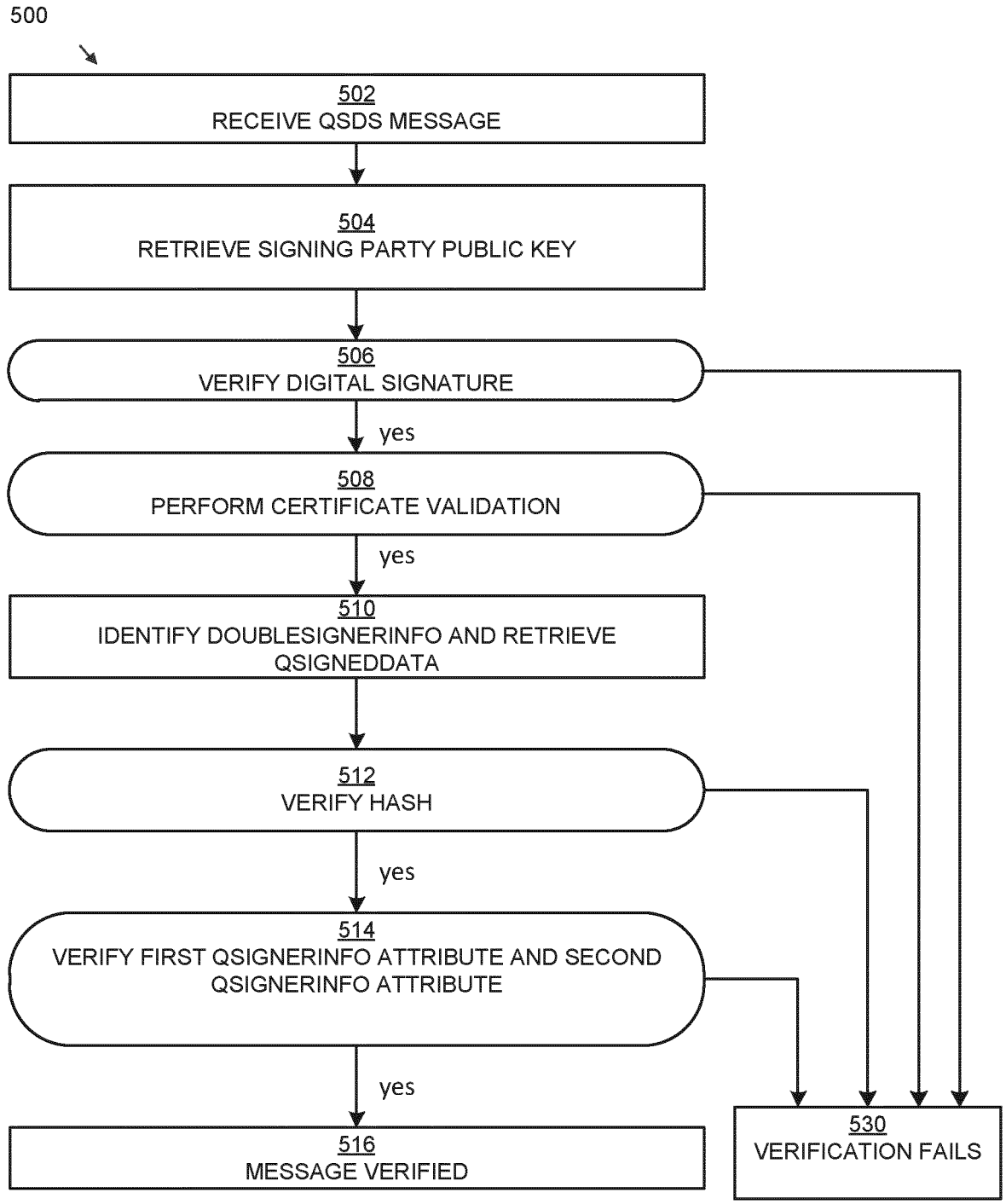
FIG. 5 is a flow diagram illustrating a method of validating the generated QSDS message of FIG. 4, according to an example embodiment.

Referring to FIG. 5, a flow diagram illustrating a method 500 of validating a QSDS message is shown, according to an example embodiment. The method 500 is described in connection with a recipient party (e.g., message recipient) that receives a QSDS message from a signing party. For example, the recipient party could receive a QSDS message via email generated by method 400 of FIG. 4. According to various embodiments, the recipient is an entity that receives an email on an email agent computing system that manages, or has access to, the QSDS message processing computing system 102 of FIG. 1. Accordingly, the recipient will be referred to as "email agent computing system," as the email agent computing system verifies and validates the Signerinfo and signature of the signing party and QSDS message processing computing system 102. However, the method 500 may be similarly performed by other systems and devices. As will be appreciated, if there are no threats of quantum computing compromise of the public/private key pair, the QSDS message verification would follow a current verification and path validation rules for validating a SignedData message.

The method 500 begins at 502 when the email agent computing system receives a QSDS message. The email agent computing system may receive the QSDS message shortly after generation of the QSDS message (e.g., email, communication, etc.), or it may be received at a time after generation of the QSDS message (e.g., after an event, a mortgage, etc.). The QSDS message may be received by the signing party computing system 104 directly, through a third-party entity, or through a series of entities (e.g., passed along). The QSDS message provides the recipient with all information needed to perform certificate path validation to gain assurance that the public key certificate of the signing party computing system is trusted.

At 504, the email agent computing system retrieves the public key of the signing party computing system 104 to verify the digital signature of the QSDS message. In some arrangements, the key pair is associated with a digital certificate in a PKI or CA that allows the email agent computing system (or any other entity) to look up and retrieve the public key associated with the signing party computing system 104. In other arrangements, the email agent computing system could examine a public key component in the QSDS message to verify message integrity but would be unable to get origin authenticity assurance.

At 506, the email agent computing system verifies the digital signature of the signing party computing system 104 on the digitally signed QSDS message. The verification process includes the email agent computing system generating a cryptographic hash of the content (e.g., messageDigest) identified in the digitally signed QSDS message. The hash is signed using the public key of the signing party computing system 104, a signature algorithm, and any additional parameters. If the signature is valid, the result will be the same as the value carried in the digitally signed QSDS message and the message is verified at 506. If signature fails, the result will not be the same as the value carried in the digitally signed QSDS message and the message is not verified. As will be appreciated, if the digital signature fails, the QSDS message maybe altered, either accidently or fraudulently.

At 508, the email agent computing system performs a certificate path validation to gain assurance that the public key certificate of the signing party computing system 104 is trusted. In one arrangement, path validation is performed on the signer certificate chain back to a trust anchor. The recipient determines whether the QSDS message and hash sent to the recipient is valid and trusted (e.g., that the signature itself is valid and that the certificates in the path are not on a revocation list). In some arrangements, a QSDS message includes PKI, CRLs, CA, or similar information for the recipient to track the signature back to a trust anchor/entity. For example, the recipient verifies with the public or private service provider associated with the key pair used that the public key certificate is valid. In other arrangements, the recipient can attempt to verify the signed version of the hash that the recipient has received from the sender by using the public key of the signing party computing system 104. The verification procedure uses the public key of the signing party computing system 104 in a mathematical operation to determine whether the signature was indeed created from the same hash using the correct private key. If the verification function is successful, the signed version of the hash will be proven to have originated from the hash that the email agent computing system has produced by applying the hash function directly to the message. A successful verification operation therefore allows the email agent computing system to confirm the true authorship of the message. At the completion of 508, the email agent computing system recognizes that the message is doubly-signed and requires verification of the QSDS message to gain assurance in the digital signature.

At 510, the email agent computing system retrieves the QSignedData message that is linked to the doubleSignerInfo attribute in the QSDS message. In some embodiments, the email agent computing system is the QSDS message processing computing system 102. In those embodiments, the email agent computing system has access to the QSignedData message database. In other embodiments, the email agent computing system is separate from the QSDS message processing computing system 102. In those embodiments, the email agent computing system requests the QSignedData message from the QSDS message processing computing system 102 by providing the doubleSignerInfo attribute in the QSDS message. In either embodiment, the QSDS message processing computing system 102 uses the doubleSignerInfo attribute to query a database for a QSignedData message whose content field contains the same doubleSignerInfo attribute. If the doubleSignerInfo attribute is absent, the QSDS message is not verified.

At 512, the email agent computing system generates a fresh cryptographic hash of the content (e.g., messageDigest) and doubleSignerInfo in the identified QSignedData message. The email agent computing system computes a hash over the messageDigest attribute value in the provided first qSignerInfo using the same message digest algorithm used to create the QSignedData message (e.g., at 416 of FIG. 4).

At 514, the email agent computing system verifies the signature of the SignedAttributes component (e.g., value) of the second QSignerinfo. The verification process includes the email agent computing system generating a cryptographic hash of the content (e.g., messageDigest, content) identified in the SignedAttributes component of the second QSignerinfo. The hash is signed using the private key of the QSDS message processing computing system 102, the signature algorithm used to previously generate the QSignedData message (e.g., at 220 in method 200 of FIG. 2), and any additional parameters previously included (as indicated in the second QSignerinfo). If the signature is valid, the resulting freshly signed SignedAttributes component of the second QSignerinfo will be the same as the value carried in the digitally signed the QSignedData message and the message is verified. If signature fails, the result will not be the same as the value carried in the QSignedData message (and therefore would not match the one in the linked doubleSignatureInfo) and the message is not verified. If the digital signature verification fails, the QSDS message may have been altered, either accidently or fraudulently. The email agent computing system may transmit a verification failed message to the recipient in the form of an error message or rejecting the email.

At 516, the email agent computing system verifies the first qSignerInfo and second QSignerinfo sttribute included in the doubleSignerInfo attribute. The email agent computing system compares first qSignerInfo in the doubleSignerInfo of the QSDS message to the second QSignerinfo in the doubleSignerInfo of the QSignedData message. If the first qSignerInfo matches the second QSignerinfo, the verification process is completed. If the first qSignerInfo does not match the second QSignerinfo, the message is not verified. In those situations, the email agent computing system may transmit a verification failed message to the recipient in the form of an error message or rejecting the email.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits ("IC"), discrete circuits, system on a chip ("SOCs") circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor that, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits ("ASICs"), field programmable gate arrays ("FPGAs"), digital signal processors ("DSPs"), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus; for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick, or other input devices performing a similar function. Comparatively, the term "output device," as described herein, may include any type of output device including, but not limited to, a computer monitor, printer, facsimile machine, electroencephalogram, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions, and arrangement of the embodiments without departing from the scope of the present disclosure as expressed in the appended claims.

What is claimed:

1. A method, comprising: receiving, by a quantum-resistant double signature (QSDS) message processing computing system, a messageDigest attribute value; the messageDigest attribute value comprising a hash of content;
    digitally signing, by the QSDS message processing computing system, the messageDigest attribute value with a first private key associated with the QSDS message processing computing system using a quantum-resistant signature algorithm to generate a quantum-resistant digital signature value;
    generating, by the QSDS message processing computing system, a QuantumSignerInfo (QSignerInfo) type, comprising: a public key identifier of a first public key of a first public/private key pair including the first private key, and the quantum-resistant digital signature value;
    generating, by the QSDS message processing computing system, a QSignerinfo attribute that identifies the QSignerinfo type; and
    transmitting, by the QSDS message processing computing system, the QSignerinfo attribute to a recipient, wherein the recipient digitally signs the QSignerinfo attribute with a second private key associated with the recipient using a quantum-vulnerable signature algorithm to generate a double signature value, wherein origin authenticity of the double signature value can be determined by using a second public key of the recipient, the second public key of a second public/private key pair including the second private key, and wherein data integrity of the content associated with the double signature can be verified via the hash of the content.

2. The method of claim 1, further comprising generating a QuantumSignedData (QSignedData) message that comprises the QSignerInfo type.

3. The method of claim 2, wherein an identifier of a digest algorithm used to generate the messageDigest attribute value and an identifier of the quantum-resistant signature algorithm are in the QSignerinfo type.

4. The method of claim 2, wherein digitally signing the message Digest attribute value with the first private key further comprises:
    digitally signing, by the QSDS message processing computing system, the messageDigest attribute value with the first private key using Signed Data cryptographic message syntax to generate the QSignedData message; and binding, by the QSDS message processing computing system, the public key identifier to the QSignedData message via an attribute of the Signed Data cryptographic message syntax.

5. The method of claim 4, wherein a bundled certificate identifier comprises a signed attribute bound to the QSignedData message, the bundled certificate identifier including a certificate issuer and a certificate identifier.

6. The method of claim 1, wherein the recipient digitally signing the QSignerinfo attribute with the second private key further comprises digitally signing a value of SignedAttributes, the value of SignedAttributes comprising the QSignerinfo attribute, the messageDigest attribute value, and a contentType attribute.

7. The method of claim 1, wherein origin authenticity of the quantum-resistant digital signature value can be determined by using the first public key of the QSDS message processing computing system, the first public key of the first public/private key pair including the first private key, and wherein data integrity of content associated with the quantum-resistant digital signature value can be verified via the hash of the content.

8. A method, comprising: receiving by a quantum-resistant double signature (QSDS) message processing computing system, a doubleSignerinfo attribute comprising: a messageDigest attribute value associated with a digitally signed quantum-resistant double signature (QSDS) message, the QSDS message is generated by digitally signing a value of SignedAttributes, and a quantumDigitallySigned attribute (quantumDSigned attribute) using a first private key associated with a signing party using a quantum-vulnerable signature algorithm; the messageDigest attribute value comprising a hash of content; and
    a quantum identifier signaling that the QSDS message is associated with a Signerinfo attribute of the QSDS message processing computing system; and
    digitally signing, by the QSDS message processing computing system, the doubleSignerinfo attribute with a second private key associated with the QSDS message processing computing system using a quantum-resistant signature algorithm to generate a quantum-resistant digital signature value;
    wherein origin authenticity of the quantum-resistant digital signature value can be determined by using a second public key of the recipient, the second public key of a second public/private key pair including the second private key, and wherein data integrity of the content associated with the quantum-resistant digital signature value can be verified using the hash of the content and the QSDS message.

9. The method of claim 8, further comprising generating a QuantumSignedData (QSignedData) message that comprises the doubleSignerinfo attribute.

10. The method of claim 9, wherein an identifier of a digest algorithm used to generate the messageDigest attribute value and an identifier of the quantum-resistant signature algorithm are in the QSignerinfo type.

11. The method of claim 9, wherein digitally signing the doubleSignerinfo attribute with the second private key further comprises: digitally signing, by the QSDS message processing computing system, the messageDigest attribute value with the second private key using Signed Data cryptographic message syntax to generate the QSignedData message; and binding, by the QSDS message processing computing system, the public key identifier to the QSignedData message via an attribute of the Signed Data cryptographic message syntax.

12. The method of claim 11, wherein a bundled certificate identifier comprises a signed attribute bound to the QSignedData message, the bundled certificate identifier including a certificate issuer and a certificate identifier.

13. The method of claim 8, wherein digitally signing the doubleSignerinfo attribute with the second private key further comprises: digitally signing, by the QSDS message processing computing system, the value of SignedAttributes, the value of SignedAttributes comprising the double-Signerinfo attribute, the messageDigest attribute value, and a contentType attribute.

14. A quantum-resistant double signature (QSDS) message processing computing system comprising: a hardware processor; and a storage device comprising a plurality of QuantumSignedData (QSignedData) messages and associated QuantumSignerInfo (QSignerInfo) types;

a message server system, the message server system comprising a processor and instructions stored in non-transitory machine-readable media, the instructions configured to cause the server system to: receive a messageDigest attribute value, the messageDigest attribute value comprising a hash of content;

digitally sign the messageDigest attribute value with a first private key associated with the QSDS message processing computing system using a quantum-resistant signature algorithm to generate a quantum-resistant digital signature value;

generate a QuantumSignerInfo (QSignerInfo) attribute that identifies the QSignerinfo type, wherein QSignerinfo type, comprising: a public key identifier of a first public key of a first public/private key pair including the first private key;

and transmit the QSignerinfo attribute to a recipient, wherein the recipient digitally signs the QSignerinfo attribute with a second private key associated with the recipient using a quantum-vulnerable signature algorithm to generate a double signature value, wherein origin authenticity of the double signature value can be determined by using a second public key of the recipient, the second public key of a second public/private key pair including the second private key, and wherein data integrity of the content associated with the double signature can be verified via the hash of the content.

15. The QSDS message processing computing system of claim 14, wherein the server system is further configured to generate a QuantumSignedData (QSignedData) message that comprises the QSignerinfo type.

16. The QSDS message processing computing system of claim 15, wherein an identifier of a digest algorithm used to generate the messageDigest attribute value and an identifier of the quantum-resistant signature algorithm are in the QSignerinfo type.

17. The QSDS message processing computing system of claim 15, wherein digitally signing the message Digest attribute value with the first private key further comprises: digitally signing, by the QSDS message processing computing system, the messageDigest attribute value with the first private key using SignedData cryptographic message syntax to generate the QSignedData message; and binding, by the QSDS message processing computing system, the public key identifier to the QSignedData message via an attribute of the SignedData cryptographic message syntax.

18. The QSDS message processing computing system of claim 17, wherein a bundled certificate identifier comprises a signed attribute bound to the QSignedData message, the bundled certificate identifier including a certificate issuer and a certificate identifier.

19. The QSDS message processing computing system of claim 14, wherein origin authenticity of the quantum-resistant digital signature value can be determined by using the first public key of the QSDS message processing computing system, the first public key of the first public/private key pair including the first private key, and wherein data integrity of content associated with the quantum-resistant digital signature value and the can be verified via the hash of the content.

20. The QSDS message processing computing system of claim 13, wherein the recipient digitally signing the QSignerinfo attribute with the second private key further comprises digitally signing a value of SignedAttributes, the value of SignedAttributes comprising the QSignerinfo attribute, the messageDigest attribute value, and a contentType attribute.

* * * * *